(No Model.)
H. KAPPNER.
Wheelwright's Gage.
No. 242,457. Patented June 7, 1881.
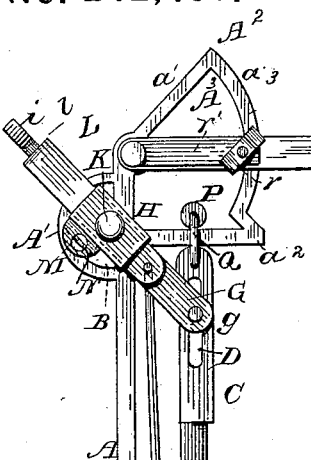
Fig. 1.
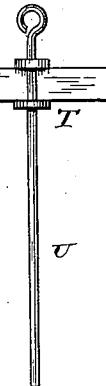
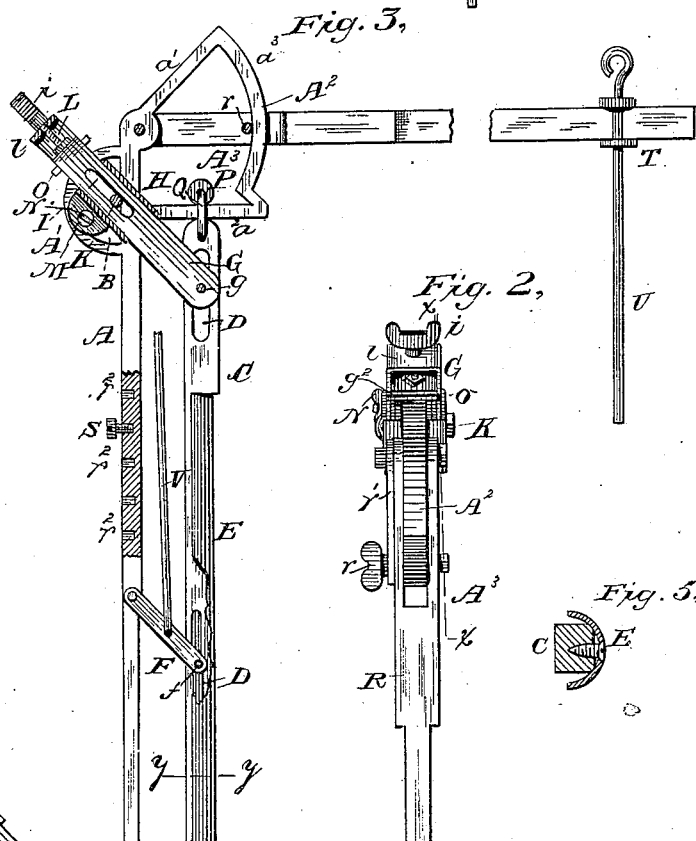
Fig. 2. Fig. 3. Fig. 5.
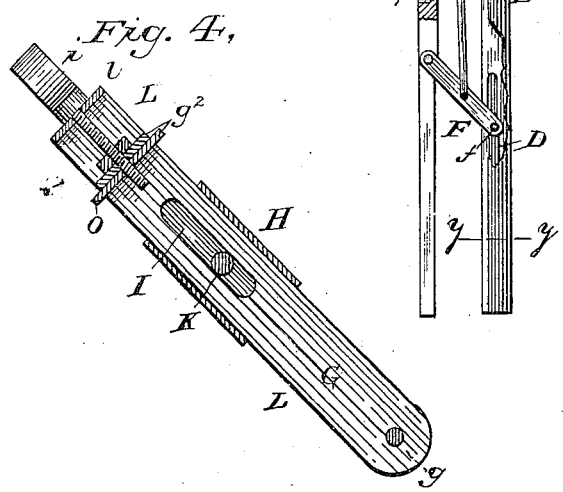
Fig. 4.
WITNESSES
Fred G. Dieterich
C. A. Baker
By his Attorneys
C. A. Snow & Co.
INVENTOR
H. Kappner
N. PETERS, Photo-Lithographer, Washington, D. C.

UNITED STATES PATENT OFFICE.

HENRY KAPPNER, OF DENVER, COLORADO.

WHEELWRIGHT'S GAGE.

SPECIFICATION forming part of Letters Patent No. 242,457, dated June 7, 1881.

Application filed April 8, 1881. (No model.)

*To all whom it may concern:*

Be it known that I, HENRY KAPPNER, of Denver, in the county of Arapahoe and State of Colorado, have invented certain new and useful Improvements in Wheelwrights' Gages; and I do hereby declare that the following is a full, clear, and exact description of my invention, which will enable others skilled in the art to which it appertains to make and use the same, reference being had to the accompanying drawings, which form a part of this specification.

This invention relates to that class of devices commonly known as "wheelwrights' gages;" and it consists in the combination and construction of parts, as hereinafter fully described, and particularly pointed out in the claims.

In the drawings, Figure 1 is a side elevation; Fig. 2, a top or plan view; Fig. 3, a section taken through the same on the dotted line $x\,x$. Fig. 4 is a detail view, and Fig. 5 is a transverse sectional view of the bar C and plate E on the line $y\,y$.

A indicates a bar provided with a semicircular slot, B, in its enlarged end A'.

C is a bar provided with slots D D and with a plate, E, which is secured by screws, so that it can be detached when the device is used for light work. The bar C is connected with the bar A by means of a link, F, that is pivoted to the bar A, and provided with a pin, $f$, which passes through the lower slot, D, of the bar C.

G indicates a long metal yoke or link, having at one end a pin, $g$, which passes through the upper one of the slots D in said bar C. The side bars of this link G pass through the sleeves H H, and are formed with slots I I, through which passes the pin K, that pivots these sleeves upon opposite sides of the enlargement A' of the bar A.

L indicates another yoke or link, which embraces the link G, the side bars of said yoke L also passing through the sleeves H, and being each provided with a perforation, through which the pin K passes.

The sleeves H have each a flange or ear, M, through which passes a set-screw, N, said set-screw also passing through the slot B in the enlargement A' of the bar A. A set-screw, $i$, passes through the outer end, $l$, of the yoke or link L, and also through the outer end, $g^2$, of the link G, which is within the yoke L.

A notched plate, O, is arranged within the link G, and the set-screw $i$ also passes through this plate.

The bar A, in addition to the enlargement A' at its upper end, is also provided at said end with a head or plate, $A^2$, having an opening, $A^3$, made through it, so that the sides of said opening are formed of the bar A and the three bars $a'\,a^2\,a^3$, the bar $a'$ being at an obtuse angle to the bar A, the bar $a^2$ at a right angle to the said bar A, and the bar $a^3$, which connects the ends of the bars $a'\,a^2$, being curved.

P indicates a roller, which rests upon the upper side of the bar $a^2$, so as to travel along the same. This roller is mounted upon a link, Q, which connects with the upper end of the bar C, so as to suspend said bar.

R indicates a wooden bar, which is pivoted to the upper end of bar A, said bar R being bifurcated at its pivoted end, and its prongs being adapted to embrace the head $A^2$ of the bar A. A set-screw, $r$, passes through the bifurcated end of the bar R, and also through metal plates $r'$, that are secured to said bar.

The bar A is provided with a series of holes, $r^2$, for the reception of a screw-threaded pin, S. The bar R is provided with a clip, T, adjustably secured thereto by a set-screw, $t$. A long rod or pin, U, passes through this clip, and can be adjusted up or down through the same.

In using this device it is manipulated as follows: The bars A C are inserted into the axle-box up to the screw-pin S, which can be secured in the required hole provided for its reception. The bar C is moved away from the bar A to fill the box by moving the link L upon its pivot, which will consequently vibrate the link G connecting with the upper slotted end of bar C, and which will also vibrate the link F by reason of the connection that is made between the links F and G by means of rods V V. The two bars will be then held apart by tightening up set-screw N, that passes through the ears of sleeves H, so as to clamp said ears upon the enlargement A' of bar A. In order to now adjust the bars to the bevel of the box, the set-screw $i$, that passes through the links L G, is operated, the said link G moving within the link L, since the pin which pivots the outer link passes through slots in the inner link, and hence, as the inner link, G, connects with bar C, the upper end of said bar will be moved toward or away from bar A, according to the direction in which the set-screw is turned. It will be noticed that the roller upon the link connecting with the upper end of bar C admits of such movement of the bar.

The bar R can be moved up or down, as may be required, and secured at the desired angle by tightening up the set-screw that passes through its bifurcated end, the prongs being either clamped upon the head of bar A; or, if desired, the plates r' may be spring-plates and have pins at their ends adapted to pass through bar R and bear against the curved bar $a^3$ of the head of bar A when said set-screw is tightened up.

The pin U will be adjusted by the operator with reference to the required gage, and the clip through which the pin passes can be adjusted upon the bar with reference to the diameter of the wheel.

The above-described device is especially applicable for gaging the dish of wheels, as will be readily understood by those skilled in the art.

Having thus described my invention, what I claim, and desire to secure by Letters Patent, is—

1. The combination, in a wheelwright's gage, of the bar A, having a semicircular slot at one end, with the bar C, provided with two slots, the link F, connecting said bars, a link, G, connected by rods with the link F, and the link L, connected with the bars A and C, substantially as described.

2. In a wheelwright's gage, the combination of the bars A C, connected by links, the roller arranged in the opening of the head of bar A, and mounted upon a link connecting with the bar C, the set-screw bar, adjusting-links G L, and the pivoted arm R, carrying an adjustable clip and pin, as set forth.

3. The combination of the bars A C, connecting-links F G L, rods V, and the sleeves H H, having lugs M and set-screw N, all arranged and operating as herein-described, for the purpose set forth.

4. In a wheelwright's gage constructed substantially as described, the combination, with the bar A, having semicircular slot B, and the adjustable bar C, of the pivoted sleeves H H, having lugs M and set-screw N, sliding link G, connected adjustably to the bar C, and the pivoted link L, substantially as herein described, for the purpose set forth.

In testimony that I claim the foregoing as my own I have hereto affixed my signature in presence of two witnesses.

HENRY KAPPNER.

Witnesses:
A. V. SCHERRER,
F. J. SPINDLER.